3,234,352
WELDING OF METAL EDGE PORTIONS
Jack Morris, Monsey, and Wallace C. Rudd, Larchmont, N.Y., assignors to American Machine & Foundry Company, New York, N.Y., a corporation of New Jersey
Filed July 23, 1963, Ser. No. 297,140
17 Claims. (Cl. 219—67)

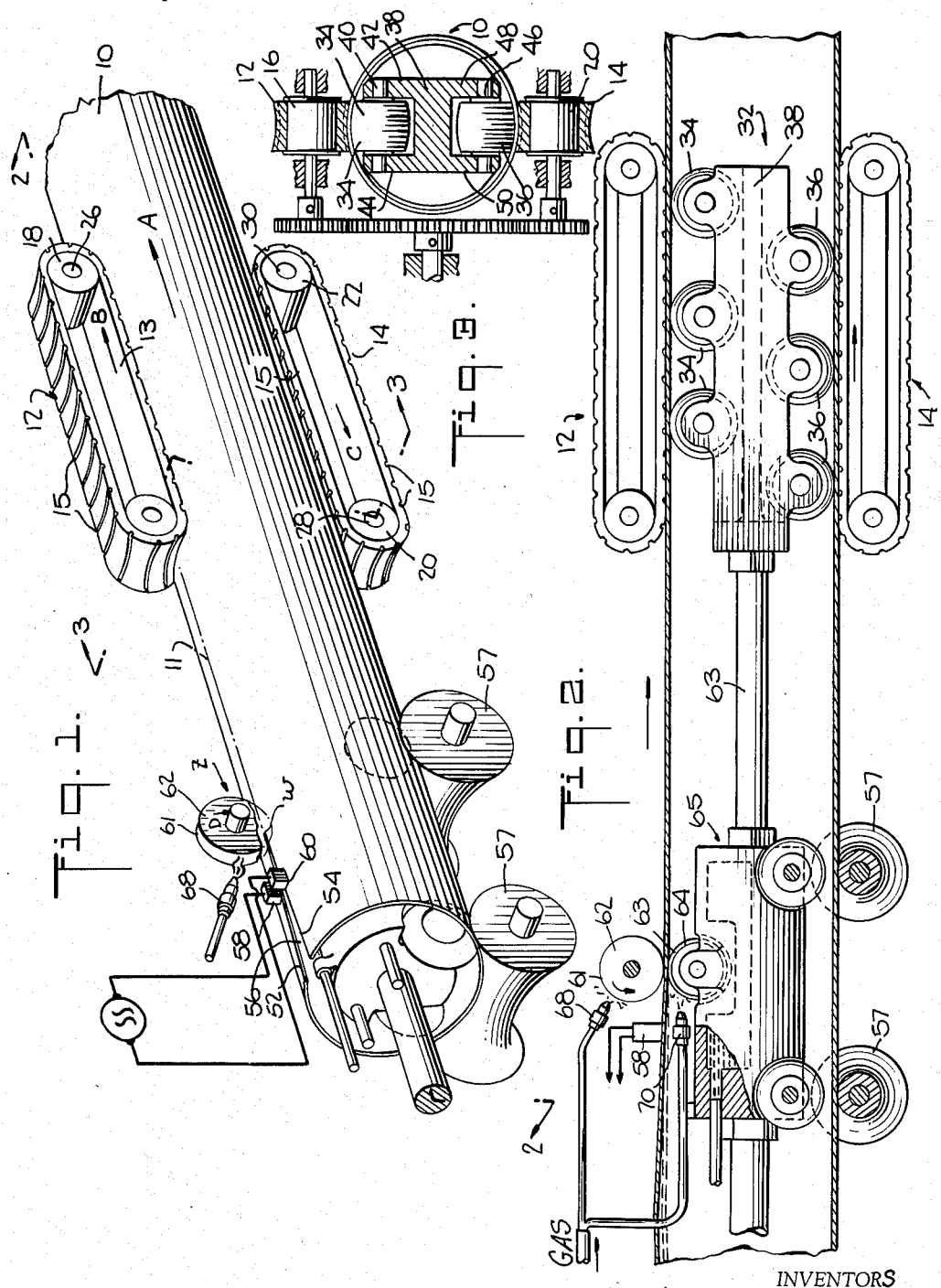

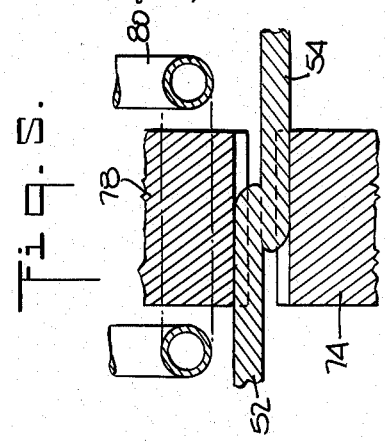
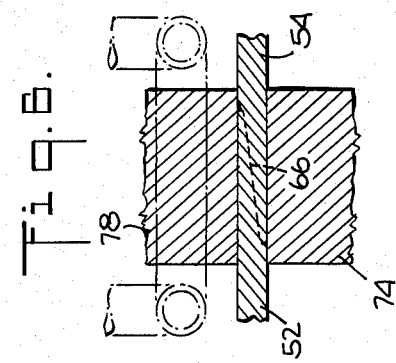
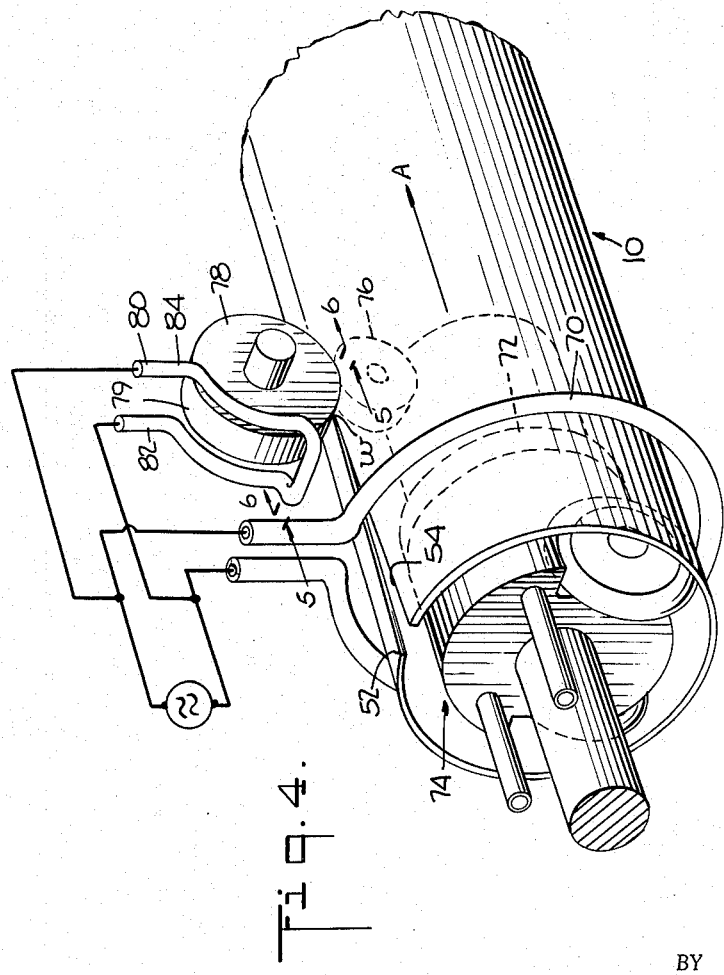
INVENTORS
JACK MORRIS
BY WALLACE C. RUDD
ATTORNEYS United States Patent Office 3,234,352
Patented Feb. 8, 1966

The present invention relates to continuous lapped welding and more particularly to novel methods and apparatus for continuously welding together longitudinal opposed edges of metal portions to form a continuing length of tubing or connected strips.

As disclosed in the U.S. Patent to Rudd No. 2,886,691 granted May 12, 1959, and in U.S. Patent to Kohler No. 3,037,105 granted May 29, 1962, continuous tubing may be formed from a thin metal strip by bringing together in overlapping spaced relationship of the opposite longitudinal edges of the strip, applying high-frequency electrical heating means to the overlapped portions to heat them to welding temperature and passing the heated overlapped portions between a pair of opposed pressure rollers which press the overlapped portion into welded relationship.

The methods and apparatus disclosed in said patents have proved to be highly successful. However, it has been found in some cases that, with relatively thick metal stock, for example greater than .012 inch in thickness, fault lines may develop at the ends of the weld area as viewed in cross-section. This fault, commonly referred to as a "cold shut" is generally believed to be caused by a quenching or chilling of the circumferentially flowing weld metal as the heated overlapped sections pass between the pressure rollers. The pressure rollers, being metal and if unheated, absorb heat from the weld metal of the overlapped sections passing therebetween, unduly cooling portions of these sections and interfering with the proper forging together of the weld metal of the contiguous edges. Such a quenched weld may exhibit the detrimental faults or "cold shuts" and tends to open or fail when subsequently stressed.

To overcome the problem of "cold shuts," with the present invention, means are provided for maintaining the weld temperature of the overlapped edges of the stock as they pass between the pressure rollers. In certain forms of the invention there is provided means for heating the surfaces of the pressure rollers which contact the tubing at the weld point. These surfaces are heated by flame means or by electrical induction heating means to an elevated temperature sufficient to avoid chilling of the sections to be welded. As the overlapped weld sections travel between the heated pressure rollers, any temperature gradient or differential between the metal strips and the rollers is sufficiently minimal and hence no chilling or quenching of the weld areas occurs. It has been found that, by such heating of the pressure roller surfaces, "cold shuts" can be vertically eliminated.

Substantially the same result is accomplished by forming the pressure rollers of material having a low coefficient of thermal conductivity such as alumina, carbide, quartz and the like. With low heat conductive rollers the surfaces thereof in contact with the heated overlapped edges become heated. However, since the rollers are of low heat conductive material, such surface heat is not conducted away from the roller surface, but rather said surfaces remain heated, maintaining any temperature gradient or differential between the metal to be welded and the pressure rollers at a desired minimum, thereby eliminating "cold shuts."

It has further been found that, when forming thin-walled tubing of relatively large diameter, such as, one and one-half inches, two inches and three inches, which generally do not have very high circumferential rigidity, problems have been encountered in properly advancing such tubing through the welding zone. In fabricating the tubing, the metal strips are conventionally pulled through a forming mill where the strip is formed into the desired tubular shape and hence through the welding zone by means of a pair of endless travelling conveyor belts which frictionally engage diametrically opposed outer portions of the formed tube after it passes through the welding zone. With tubing having low circumferential rigidity, the formed tube, upon engagement by the conveyor belts, tends to collapse radially inwardly away from gripping engagement with the conveyor members. This prevents proper frictional engagement between the belts and tubing and interferes with the movement of the tubing material through the forming mill and welding zone.

To overcome this collapsing problem, the present invention contemplates the provision of a support unit internally disposed within the formed tubing. The support unit is provided with rolls curved to the shape of the formed tube which contact the inner wall of the tubing adjacent the area of operation of the conveyor belts. The support unit rollers maintain the tubing wall in fixed position relative to the conveyor belts, preventing the inward collapse of the tubing and thus cooperate with the conveyor belts to ensure proper frictional engagement of the tubing and belts to advance the tubing material through the forming die and welding zone.

Further objects and advantages of the invention will be obvious herefrom or may be learned by practice with the invention the same being realized and attained by means of the instrumentalities and combinations pointed out in the appended claims.

The foregoing general description and the following detailed description are exemplary and explanatory but are not restrictive of the invention.

Of the drawings illustrating by way of example, preferred embodiments of the invention and wherein like numerals designate like parts:

FIG. 1 is a perspective view, somewhat schematic, of a first embodiment of apparatus for carrying out the present invention;

FIG. 2 is a longitudinal cross-sectional view taken along line 2—2, FIG. 1;

FIG. 3 is a cross-sectional view taken along line 3—3, FIG. 1;

FIG. 4 is a perspective view, somewhat schematic, of a second embodiment of apparatus for carrying out the present invention;

FIG. 5 is a cross-sectional view taken along line 5—5, FIG. 4 illustrating the arrangement of the overlapped edge portions just prior to entry between the pressure rollers; and FIG. 6 is a cross-sectional view taken along line 6—6, FIG. 5 showing the welded overlapped edge portions as they pass between the pressure rollers to form the lapped weld.

Referring now to FIG. 1, a length of thin-walled sheet metal tubing 10 is shown being advanced in the direction of arrow A through a welding zone, designated generally Z. To advance tubing 10 in the direction of arrow A, there is provided at a location, after the tubing leaves the welding zone, a pair of endless conveyor belts 12 and 14 adapted to frictionally engage the tubing and pull it through the forming die (not shown), and the welding zone Z.

Preferably for this purpose, belts 12 and 14 are of rubber or other material having a high coefficient of friction and are formed with transverse grooves 15 to provide improved tube-gripping qualities. Belt 12, a lap 13 of which frictionally engages the outer surface of tubing 10 preferably adjacent the longitudinal weld seam 11, is mounted for travel around spaced pulley rollers 16 and 18. Belt 14 one of whose laps 15 frictionally engages the surface of tubing 10 at a position thereof diametrically opposite the area of operation of belt 12 is in turn, trained around pulley rollers 20 and 22.

Rollers 16 and 18 are supported on the ends of associated shafts 24 and 26 respectively while rollers 20 and 22 are mounted on shafts 28 and 30. One of the shafts 24 or 26 for belt 12 or shafts 28 or 30 for belt 14 may be driven by any suitable powers means (not shown) such as, gears and an electric motor, to advance belts 12 and 14 in the respective directions of the arrows B and C, FIG. 1 to pull tubing 10 through the weld zone Z in the direction of arrow A. Also, as shown best in FIGS. 1–3, rollers 16, 18, 20 and 22 are each concave in cross-section to approximate the contour of the outer surface of tubing 10, thus ensuring firm gripping engagement between belts 12 and 14 and tubing 10.

Cooperating with belts 12 and 14 to facilitate gripping engagement thereof with tubing 10 is a support carriage designated generally 32. Carriage 32 includes a plurality of rollers 34 and 36 rotatably supported by carriage body section 38. Section 38 is preferably of metal and preferably H-shaped in cross-section with rollers 34 supported on associated shafts 40 rotatably carried in spaced relationship in the upper arms 42 and 44 of section 38. Rollers 36, in turn, are mounted on associated shafts 46 and rotatably carried at spaced intervals in the lower spaced arms 48 and 50 of section 38.

Rollers 34 and 36 are convex in cross-section to approximate the contour of the inner surface of tubing 10. In operation, rollers 34 cooperate with the lap 13 of belt 12 by supporting tubing 10 from within at spaced intervals in the run of belt 12 between rollers 16 and 18 while simultaneously rollers 36 cooperate with lap 15 of belt 14 by supporting tubing 10 from within at spaced intervals in the run of belt 14 between rollers 20 and 22. Rollers 34 and 36 while in rolling frictional contact with their respective portions of the surface of tubing 10 maintain the upper and lower sections of the tubing sidewall in fixed vertical position and in contact with belts 12 and 14. Thus, carriage 32 prevents radially inward movement of the tubing sidewall, ensuring proper gripping thereof by belts 12 and 14 and movement of tubing 10 through the forming die and welding zone Z.

At the welding zone, the metal stock from which tubing 10 is formed is shaped into generally tubular configuration as it approaches zone Z. As in the case of the aforesaid patents, the opposed edges 52 and 54 are brought into overlapped relationship and spaced by a gap 56, the gap 56 diminishing just in advance of weld point "w" and are supported on a plurality of freely rotatable concave support rollers 57.

In the embodiment of FIG. 1, there is provided a pair of fluid-cooled electrodes 58 and 60 mounted for slidable engagement with edges 52 and 54 respectively shortly in advance of the weld point. Electrodes 58 and 60 are preferably connected to a source of high frequency current having a frequency of the order of 100,000 cycles per second or higher, for example several hundred thousand cycles per second. Electrodes 58 and 60 are operative to provide a band of heating current on the underface of edge 52 and on the upper surface of edge 54, heating the two contacting faces to welding temperature upon passage thereof to the weld point "w."

At weld point "w," edges 52 and 54 are brought into intimate contact between a pair of rigid pressure rollers 62 and 64. Pressure roller 62 is pressure biased by any suitable means; such as, a weight or spring in the direction of the arrows D to apply pressure over the weld point "w" where edges 52 and 54 are in contact. Cooperating with roller 62 is roller 64 which is positioned in supporting contact with the undersurface of edge 54 at weld point "w." Edges 52 and 54 are advanced between rollers 62 and 64 to fuse or weld their heated areas together to form a longitudinal lapped weld on tubing 10. Roller 64 is preferably supported by a suitable stationary carriage 65 similar in construction and operation to carriage 30 of the aforesaid Patent 2,886,691. Further detailed disclosure thereof is omitted in the interests of brevity. However, carriage 65 is preferably connected to carriage 32 by means of a connecting shaft 63 to thereby maintain carriage 32 and its associated elements in fixed position axially within tubing 10.

The "cold shuts" generally occur at the extremities 66 and 67 of the weld seam 11. These defects, usually appear as unborded or ravelled portions of the weld and generally run discontinuously along the longitudinal edges of weld seam 11, as shown best in FIG. 6. It is believed that the "shuts" develop at the extremities of the weld because the metal at these weld portions have flowed the furthest distance under the influence of the pressure rollers, and, accordingly, have been cooled the most by heat losses to the rollers.

To prevent the development in the weld of faults or "cold shuts" as at 66 of FIG. 6, there is provided heating means for rollers 62 and 64 comprising gas flame jets 68 and 70, preferably connected to a common source of supply of gas. Jets 68 and 70 direct flames to the peripheral surfaces 61 and 63 respectively of their associated rollers 62 and 64 adjacent the area on the roller periphery just in advance of rolling contact with tubing 10 to heat said portions of the rollers to an elevated temperature sufficient to avoid chilling of the metal stock of tubing 10, thereby preventing quenching or cooling of the weld by the rollers 62 and 64. Thus, as the contacting overlapped edges 52 and 54 advance between heated rollers 62 and 64, there being no undue temperature differential therebetween, no substantial heat loss is experienced from the heated edges 52 and 54 to the cooler rollers 62 and 64, as was the case heretofore.

Turning to the embodiment of the invention shown in FIG. 4, edges 52 and 54, as heretofore, are brought into overlapped spaced relation just in advance of weld point "w" and are heated by means of an induction coil 70. Coil 70 is supplied with high frequency currents preferably of the order of those above mentioned or lower frequencies may be here used.

An annular magnetic core or impeder means 72 formed of ferrous insulating material, is mounted axially within tubing 10 on suitable support means 74 and this support may carry a roller 76. Core 72 and its support means are preferably similar in construction and operation to core 34 and its associated elements disclosed in U.S. Patent 3,037,105.

The metal of the tubing is shaped by advance thereof through a forming die (not shown) by means of belts 12 and 14 as disclosed heretofore in the embodiment of FIG. 1. The overlapped edge portions 52 and 54 are welded or forged together at the weld point "w" by a pressure biased upper roller 78 similar to roller 62 of the first embodiment. Roller 78 cooperates with roller 76 on the core support means 74 to exert the necessary pressure on edges 52 and 54 to bring them into intimate overlapped contact to forge weld said edges together.

In this second embodiment, "cold shuts" are avoided by providing a second induction heating element 80 connected if desired to the same source of high frequency current as coil 70. Induction element 80 is bifurcated with the sections 82 and 84 thereof spaced on each side of roller 78 and conforming generally to the periphery of roller 78. Induction element 80 induces heating currents in the peripheral portion 79 of roller 78 with sections 82 and 84 mounted adjacent and conforming generally thereto such that surface 79 is heated to the desired elevated temperature as it rotates into contact with tubing 10 at weld point "w." In this embodiment, due to the arrangement of elements, lower pressure roller 76 is unheated. However, roller 76 may be formed of low heat conductive material; such as, alumina, carbide, quartz or the like, which also functions as described above to maintain the temperature of the heated edges 52 and 54 contacted thereby.

If desired, the gas flame jets 68 and 70 of the embodiment of the invention of FIG. 1 or the induction element 80 of the embodbiment of FIG. 4 may be eliminated and rolls 62, 64 and 78 formed of a material having a low coefficient of thermal conductivity and good wearing and high temperature properties; such as, alumina, carbide, quartz or similar material, which functions to preserve and maintain the heat in edges 52 and 54 as they pass between the pressure rollers. The surface of such low thermally conductive pressure rollers becomes heated to the desired elevated temperature by contact with edges 52 and 54. With the rollers being of low heat conductivity, the heat from the surfaces thereof is not conducted away, but rather is retained on the surfaces, thus ensuring against undue cooling of the weld metal as edges 52 and 54 are welded together.

It will be understood that while pressure rollers 62 and 64 and 78 and 76 have been referred to hereinabove as upper and lower pressure rollers respectively, other orientations of the pressure rollers and weld seam can be employed without adverse effect on the operation of the present invention. It will also be understood that the use of belts 12 and 14 and carriage 32 is particularly desirable since it enables tubing 10 to be pulled through weld zone without distorting desired tube shape and, in turn, augmenting the prevention of cold shuts at the weld point "w."

It will be further understood that the location of belts 12 and 14 could be re-oriented, as desired, such as at right angles to its present illustrated position, if it were preferred not to have such belts engage the freshly welded seam 11.

Although certain particular embodiments of the invention are herein disclosed for purposes of explanation, further modifications thereof, after study of the specification, will be apparent to those skilled in the art to which the invention pertains. Reference should accordingly be had to the appended claims in determining the scope of the invention.

What is claimed and desired to be secured by Letters Patent is:

1. Method of welding together two elongated sheet metal portions with a longitudinally extending lapped seam, comprising: longitudinally advancing the portions with the edge portions which are to be lap welded together in overlying spaced relationship, bringing said edge portions gradually into superposed contact with each other along narrow lapped surfaces at a weld point, heating said lapped surfaces in advance of said weld point by passing same through an electrical heating zone and subjecting same to flows of high-frequency electrical current to heat same to welding temperature at said weld point, characterized by providing elements against the non-contiguous surfaces of said lapped metal portions at or nearly adjacent the weld point for applying sufficient pressure thereto to substantially compress such lapped portions as said portions are advanced past said weld point while heating the surface of at least one of said elements sufficient to avoid chilling of said lapped portions.

2. The method as defined in claim 1, wherein said sheet metal portions are formed into tubing and said tubing is advanced by subjecting said formed tubing to a longitudinal pulling force at a position subsequent to the weld point and simultaneously internally supporting said tubing at a selected elevation at the position of operation of said pulling force to prevent radially inward collapse of said tubing due to said pulling force.

3. Method of welding together a longitudinally extending lapped seam in tubing formed of sheet material comprising the steps of: longitudinally advancing the tubing with the edge portions which are to be lap welded together in overlying spaced relationship, bringing said edge portions gradually into superposed contact with each other along narrow contiguous surfaces at a weld point, heating said contiguous portions of said edge portions in advance of said weld point by passing said edge portions through an electrical heating zone and subjecting said contiguous surfaces to flows of high-frequency electrical current to heat said edge portions to welding temperature at said weld point, passing said superposed edge portions between a pair of opposed pressure rollers at said weld point for welding said edge portions together along said contiguous surfaces as said tubing is advanced past said weld point, and heating at least the periphery of at least one of said rollers sufficient to avoid chilling of said superposed edges and thereby prevent cold shuts in the weld.

4. The method of claim 3 wherein said pressure roller is heated by subjecting the periphery of said roller to flame means in advance of its engagement with said tubing edge.

5. The method of claim 3 wherein said pressure roller is heated by inducing in the periphery of said roller a flow of high-frequency electrical current in advance of its engagement with said tubing edge.

6. The method as defined in claim 3 wherein said tubing is advanced by frictionally engaging said welded tubing and subjecting it to a longitudinal pulling force at a position subsequent to said weld point and simultaneously internally supporting said tubing at a selected elevation at the position of frictional engagement thereof to prevent radially inward collapse of said tubing.

7. Method of welding together a longitudinally extending lapped seam in tubing formed of sheet metal comprising: longitudinally advancing the tubing with the edge portions which are to be lap welded together in overlying spaced relationship, bringing said edge portions gradually into superposed contact with each other along narrow lapped surfaces at a weld point, heating said lapped surfaces in advance of said weld point by passing same through an electrical heating zone and subjecting same to flows of high-frequency electrical current to heat same to welding temperature at said weld point, passing said superposed edge portions between a pair of opposed pressure rollers at the weld point to weld said edge portions together as said tubing is advanced past said weld point, said tubing being advanced by subjecting said welded tubing to a longitudinal pulling force at a position subsequent to the weld point and simultaneously internally supporting said tubing at a selected elevation at the position of operation of said pulling force to prevent radially inward collapse of said tubing due to said pulling force.

8. Apparatus for joining overlapped sheet metal portions having a longitudinally extending lapped seam by welding together in overlying relationship the longitudinal edges of an elongated flat sheet of sheet metal material comprising in combination means for advancing the material while bringing the longitudinal edges of said material into overlying spaced relationship, and gradually into superposed contact, with a narrow band of one of said superposed edges abutting a cooperating narrow band on the other of said superposed edges at a weld point, high-frequency electrical heating means for heating said bands to weld temperature in advance of said weld point, a pair of rotatable rollers positioned at said weld point in the path of travel of said superposed edges, means mounting one of said rollers in fixed supporting position in said tubing in contact with the lowermost of said superposed edges to maintain said lowermost edge at a predetermined elevation at said weld point, means mounting the other of said rollers in position to contact the uppermost of said superposed edges and apply sufficient pressure to said superposed edges to substantially compress said edges at said weld point for welding said edges together as they move between said rollers, including means for maintaining the temperature of said bands sufficient to avoid chilling thereof as they travel between said rollers.

9. Apparatus for producing tubing having a longitudinal lapped seam by welding together in overlying relationship the longitudinal edges of an elongated flat sheet of tubing material comprising in combination means for advancing the tubing material while bringing the longitudinal edges of said material into overlying spaced relationship, and gradually into superposed contact, with a narrow band of one of said superposed edges abutting a cooperating narrow band on the other of said superposed edges at a weld point, high-frequency electrical heating means for heating said bands to weld temperature in advance of said weld point, a pair of rotatable rollers positioned at said weld point in the path of travel of said superposed edges, means mounting one of said rollers in fixed supporting position in said tubing in contact with the lowermost of said superposed edges to maintain said lowermost edge at a predetermined elevation at said weld point, means mounting the other of said rollers in position to contact the uppermost of said superposed edges and apply pressure to said superposed edges at said weld point for welding said edges together as they move between said rollers, including means for heating at least one of said rollers to an elevated temperature sufficient to avoid chilling of said bands during welding and the formation of cold shuts in the weld.

10. Apparatus for producing tubing having a longitudinal lapped seam by welding together in overlying relationship the longitudinal edges of an elongated flat sheet of tubing material comprising in combination a pair of opposed endless conveyors for advancing the tubing material while bringing the longitudinal edges of said material into overlying spaced relationship, and gradually into superposed contact, with a narrow band of one of said superposed edges abutting a cooperating narrow band on the other of said superposed edges at a weld point, means mounting said conveyors in advancing engagement with diametrically opposed sections of the outer surface of said tubing, means for internally supporting said tubing in fixed relative position adjacent the zone of operation of said conveyors, a pair of rotatable rollers positioned at said weld point in the path of travel of said superposed edges, means mounting one of said rollers in fixed supporting position in said tubing in contact with the lowermost of said superposed edges to maintain said lowermost edge at a predetermined elevation at said weld point, means mounting the other of said rollers in position to contact the uppermost of said superposed edges and apply pressure to said superposed edges at said weld point for welding said edges together as they move between said rollers, and means for heating the surface of at least one of said rollers to a temperature sufficient to avoid chilling of said bands during welding and the formation of cold shuts.

11. The apparatus of claim 10 wherein said means for heating said one of said pressure rollers includes flame means, means mounting said flame means for directing heat therefrom against the surface of said roller in advance of its engagement with said tubing edge.

12. The apparatus of claim 10 wherein said means for heating said pressure roller includes an induction heating element, means mounting said heating element on each side of said roller to be heated and adjacent and conforming generally to the periphery of said roller and means connecting said induction element to a source of high-frequency current to induce electrical heating currents in the surface of said roller in advance of its engagement with said tubing edge.

13. The invention as defined in claim 10 wherein said means for internally supporting said tubing includes a stationary carriage, means mounting said carriage axially within said tubing at the zone of operation of said conveyors, a plurality of convex rollers, means rotatably mounting said rollers in said carriage in rolling engagement with the inner surface of said tubing opposite the area of operation of said conveyors on the outer surface of said tubing whereby said tubing is internally supported as it travels through the zone of operation of said conveyors.

14. Apparatus for producing tubing having a longitudinal lapped seam by welding together in overlying relationship the longitudinal edges of an elongated flat sheet of tubing material comprising in combination means for advancing the tubing material while bringing the longitudinal edges of said material into overlying spaced relationship, and gradually into superposed contact, with a narrow band of one of said superposed edges abutting a cooperating narrow band on the other of said superposed edges at a weld point, high-frequency electrical heating means for heating said bands to weld temperature in advance of said weld point in the path of travel of said superposed edges, a pair of rotatable rollers positioned at said weld point in the path of travel of said superposed edges, means mounting one of said rollers in fixed supporting position in said tubing in contact with the lowermost of said superposed edges to maintain said lowermost edge at a predetermined elevation at said weld point, means mounting the other of said rollers in position to contact the uppermost of said superposed edges and apply pressure to said superposed edges at said weld point for welding said edges together as they move between said rollers, said rollers being formed of low thermal conductivity insulation material, whereby the surfaces of said rollers contacting said edges remain heated sufficiently due to proximity to the weld zone to prevent chilling of said edges moving therebetween and thereby avoiding the formation of cold shuts in the weld.

15. Apparatus for producing tubing having a longitudinal lapped seam by welding together in overlying relationship the longitudinal edges of an elongated flat sheet of tubing material comprising in combination pulling means for advancing the tubing material while bringing the longitudinal edges of said material into overlying spaced relationship, and gradually into superposed contact, with a narrow band of one of said superposed edges abutting a cooperating narrow band on the other of said superposed edges at a weld point, high-frequency electrical heating means for heating said bands to weld temperature in advance of said weld point, a pair of rotatable rollers positioned at said weld point in the path of travel of said superposed edges, means mounting one of said rollers in fixed supporting position in said tubing in contact with the lowermost of said superposed edges to maintain said lowermost edge at a predetermined elevation at said weld point, means mounting the other of said rollers in position to contact the uppermost of said superposed edges and apply pressure to said superposed edges at said weld point for welding said edges together as they move between said rollers, and means internally supporting said tubing at a selected elevation adjacent the zone of operation of said pulling means for preventing radially inward collapse of said tubing and facilitating welding of said tubing by said rollers.

16. Apparatus for producing tubing having a longitudinal lapped seam by welding together in overlying relationship the longitudinal edges of an elongated flat sheet of tubing material comprising in combination a pair of opposed endless conveyors for advancing the tubing material while bringing the longitudinal edges of said material into overlying spaced relationship, and gradually into superposed contact, with a narrow band of one of said superposed edges abutting a cooperating narrow band on the other of said superposed edges at a weld point, means mounting said conveyors in advancing engagement with diametrically opposed sections of the outer surface of said tubing, means for internally supporting said tubing in fixed relative position adjacent the zone of operation of said conveyors, a pair of rotatable rollers positioned at said weld point in the path of travel of said superposed edges, means mounting one of said rollers in fixed supporting position in said tubing in contact with the lowermost of said superposed edges to maintain said lowermost edge at a predetermined elevation at said weld point, means mounting the other of said rollers in position to contact the uppermost of said superposed edges and apply pressure to said superposed edges at said weld point for welding said edges together as they move between said rollers, and means for internally supporting said tubing including a stationary carriage, mounting said carriage axially within said tubing at the zone of operation of said conveyors, a plurality of convex rollers, means rotatably mounting said rollers in said carriage in rolling engagement with the inner surface of said tubing opposite the area of operation of said conveyors on the outer surface of said tubing whereby said tubing is internally supported as it travels through the zone of operation of said conveyors, thereby facilitating welding of said tubing by said pressure rollers.

17. Method of welding together the edges of elongated metal sheet to form tubing with a longitudinally extending lapped seam comprising: longitudinally advancing the metal sheet while bringing the edge portions of the sheet which are to be lap welded together into overlying spaced relationship, bringing said edge portions gradually into superposed contact with each other along narrow lapped surfaces at a weld point, heating said lapped surfaces in advance of said weld point by passing same through an electrical heating zone and subjecting same to flows of high frequency electrical current to heat same to welding temperature at said weld point, characterized by providing elements against the non-contiguous surfaces of said lapped metal portions at or nearly adjacent the weld point for applying sufficient pressure thereto to substantially compress such lapped portions as said portions are advanced past said weld point while maintaining the surfaces of said elements at a temperature sufficient to avoid chilling of said lapped portions and advancing the formed tubing by subjecting it to a longitudinal pulling force at a position subsequent to the weld point and simultaneously internally supporting said tubing at a selected elevation at the position of operation of said pulling force to prevent radially inward collapse of said tubing due to said pulling force.

References Cited by the Examiner
UNITED STATES PATENTS

| | | | |
|---|---|---|---|
| 1,172,699 | 2/1916 | Gail et al. | 219—59 |
| 1,247,501 | 11/1917 | Butcher | 219—59 |
| 1,865,530 | 7/1932 | Lutz | 219—67 |
| 2,886,691 | 5/1959 | Rudd | 219—67 |
| 3,075,484 | 1/1963 | Benteler | 113—33 |

RICHARD M. WOOD, *Primary Examiner.*

ANTHONY BARTIS, *Examiner.*